United States Patent [19]

Matsui et al.

[11] Patent Number: 4,675,490

[45] Date of Patent: Jun. 23, 1987

[54] METHOD AND APPARATUS FOR CONTROLLING ELECTRODE POSITION IN AN ELECTRIC DISCHARGE MACHINE BY COUNTING FEEDBACK PULSES AND REPEATEDLY ADDING THE COUNT

[75] Inventors: Mitsuo Matsui, Tokyo; Teruyuki Matsumura, Hachioji, both of Japan

[73] Assignee: Fanuc Limited, Hino, Japan

[21] Appl. No.: 391,386

[22] Filed: Jun. 23, 1982

[30] Foreign Application Priority Data

Jun. 25, 1981 [JP] Japan .................. 56-98703

[51] Int. Cl.⁴ .................. B23H 7/32; G05B 19/29
[52] U.S. Cl. .................. 219/69 G; 219/69 M; 318/569; 318/603
[58] Field of Search .................. 219/69 M, 69 P, 69 G, 219/69 C; 364/474; 318/569, 561, 603

[56] References Cited

U.S. PATENT DOCUMENTS

| | | | |
|---|---|---|---|
| 3,370,147 | 2/1968 | Matulaitis | 219/69 G |
| 3,435,176 | 3/1969 | Lobur | 219/69 G |
| 3,510,620 | 5/1970 | Smith | 219/69 G |
| 3,581,045 | 5/1971 | Panschow | 219/69 G |
| 3,605,000 | 9/1971 | Inaba et al. | 318/603 |
| 3,731,044 | 5/1973 | Ullmann et al. | 219/69 V |
| 3,752,969 | 8/1973 | Kiffmeyer et al. | 318/569 |
| 4,005,303 | 1/1977 | Inoue | 219/69 P |
| 4,039,779 | 8/1977 | Rupert | 219/69 G |
| 4,049,942 | 9/1977 | Balleys et al. | 364/474 |
| 4,143,310 | 3/1979 | Fujinawa et al. | 318/603 |
| 4,152,569 | 5/1979 | Bell, Jr. et al. | 219/69 G |
| 4,185,184 | 1/1980 | Pfau | 219/69 G |
| 4,254,368 | 3/1981 | Ido et al. | 318/603 |
| 4,296,364 | 10/1981 | Fukuyama et al. | 364/474 |
| 4,321,451 | 3/1982 | Inoue | 219/69 G |
| 4,321,516 | 3/1982 | Ohtsuka | 318/603 |
| 4,330,832 | 5/1982 | Kohzai et al. | 364/474 |
| 4,335,436 | 6/1982 | Inoue | 219/69 G |
| 4,350,940 | 9/1982 | Dupont | 318/603 |
| 4,361,745 | 11/1982 | Rupert et al. | 219/69 G |
| 4,370,704 | 1/1983 | Fukuyama et al. | 364/474 |
| 4,376,970 | 3/1983 | Ilseman et al. | 364/167 |
| 4,396,975 | 8/1983 | Kurakake | 364/474 |
| 4,404,505 | 9/1983 | Swanson et al. | 318/603 |
| 4,451,892 | 5/1984 | McMurtry | 364/474 |
| 4,458,190 | 7/1984 | Takawashi et al. | 318/603 |

FOREIGN PATENT DOCUMENTS

| | | | |
|---|---|---|---|
| 2638584 | 3/1978 | Fed. Rep. of Germany | 219/69 G |
| 2310833 | 12/1976 | France | |
| 52-43080 | 4/1977 | Japan | 318/569 |
| 54-12081 | 1/1979 | Japan | 318/603 |
| 54-58179 | 5/1979 | Japan | 318/569 |
| 54-141968 | 11/1979 | Japan | 318/569 |
| 1412208 | 10/1975 | United Kingdom | 219/69 G |
| 2011653A | 7/1979 | United Kingdom | 219/69 G |
| 2041576A | 9/1980 | United Kingdom | 318/569 |

OTHER PUBLICATIONS

European Search Report Place: The Hague Examiner; Dailloux.

Primary Examiner—A. D. Pellinen
Assistant Examiner—Geoffrey S. Evans
Attorney, Agent, or Firm—Staas & Halsey

[57] ABSTRACT

A method and apparatus for controlling an electric discharge machine wherein a motor for establishing relative movement between an energized electrode and a workpiece is driven in accordance to with NC command data. The method includes the steps of converting commanded speed information into a speed command value to control the speed of the motor, counting, by using a counter, pulses generated by a sensor each time the motor rotates by a predetermined amount, reading the value of the count in the counter periodically, adding the read values cumulatively to determine the present position of the electrode, and sending a command to the counter each time its counted value is read, to cancel the counted value.

6 Claims, 4 Drawing Figures

METHOD AND APPARATUS FOR CONTROLLING ELECTRODE POSITION IN AN ELECTRIC DISCHARGE MACHINE BY COUNTING FEEDBACK PULSES AND REPEATEDLY ADDING THE COUNT

BACKGROUND OF THE INVENTION

This invention relates to a method and apparatus for controlling an electric discharge machine and, more particularly, to a method and apparatus for controlling an electric discharge machine of the type in which an electrode of a prescribed shape, held close to the surface of a workpiece, is moved into the workpiece to perform cutting and an electric discharge is produced across the electrode and the workpiece, thereby to machine the workpiece into the same shape as the electrode.

One type of electric discharge machine is the wire-cut electric discharge machine, wherein a wire electrode is moved relative to a workpiece along a commanded path, thereby to perform electric discharge machining. A second type of electric discharge machine employs an electrode which has a prescribed shape and which is held close to the surface of a workpiece, the electrode being moved into the workpiece to perform cutting as an electric discharge is produced across the electrode and the workpiece, thereby to machine the workpiece into the same shape as the electrode.

FIG. 1 is a schematic explanatory view of the latter electric discharge machine. An electrode EP serving as a punch is supported by a spindle SP, and is fed for machining (i.e., advanced) in the direction of the arrow by a servomotor, not shown. A voltage is applied by a power source PS across the electrode EP and a workpiece WK, which is to be machined into a die. Accordingly, when the electrode EP is advanced while a minute gap is maintained between the workpiece WK and the electrode EP, the workpiece WK is machined into a shape similar to that of the electrode EP. An enlarged bore of desired size can be readily machined in the workpiece WK by controlling, e.g., the energy of the machining pulses. If necessary, the machining operation is carried out while the electrode EP is being moved in eccentric fashion, whereby an enlarged bore of any desired dimensions can be machined.

In the electric discharge machine of the above type, it is necessary to retract the electrode immediately upon the generation of a short-circuit signal which is produced when the electrode EP contacts the workpiece WK. However, with the conventional servomotor control method, it is not possible to retract the electrode EP immediately, even though the direction of electrode movement is changed by the generation of the shortcircuit signal. FIG. 2 is a view of a conventional servomotor control system and is useful in explaining this point.

Referring to FIG. 2, numeral 101 denotes a paper tape in which numerical control (NC) data is punched. Numeral 102 denotes a control unit which causes a tape reader (not shown) to read in the NC command data from the paper tape 101, and which decodes the read NC data, delivering, e.g., M, S and T function commands to the machine side through a heavy current switchboard and a move command $Z_c$ to a pulse distributor 103, which is the succeeding stage. The pulse distributor 103 executes well-known pulse distribution computations on the basis of the move command $Z_c$, and generates distributed pulses $P_s$ at a frequency corresponding to a commanded speed. Numeral 104 designates a known accelerator/decelerator circuit which generates a train of pulses $P_i$ by rectilinearly accelerating the pulse rate of the train of distributed pulses $P_s$ at the occurrence of this pulse train and by rectilinearly decelerating the same at the end thereof. Numeral 105 indicates a D.C. motor by which the electrode EP is fed for machining. A pulse coder 106 generates one feedback pulse FP each time the DC motor 105 rotates by a predetermined amount. An error calculating and storing unit 107 is constructed of, for example, a reversible counter, and stores the difference $E_r$ between the number of the input pulses $P_i$ received from the accelerator/decelerator circuit 104 and that of the feedback pulses FP. This error calculating and storing unit may be constructed, as shown in the figure, of an arithmetic circuit 107a for calculating the difference $E_r$ between the numbers of the pulses $P_i$ and FP, and an error register 107b for storing the error $E_r$. More specifically, assuming that the DC motor 105 is rotating in the forward direction because of a command to that effect, the error calculating and storing unit 107 operates in such a manner that each time the input pulse $P_i$ is generated, it is counted up by means of the arithmetic circuit 107a, while each time the feedback pulse FP is generated, the content is counted down, and that the difference $E_r$ between the number of input pulses and the feedback pulses is stored in the error register 107b. Numeral 108 denotes a digital-to-analog converter for generating an analog voltage proportional to the content (digital value) of the error register 107b, and numeral 109 a speed control circuit. The analog-to-digital converter 108 and speed control circuit 109 form a motor drive circuit.

When the control unit 102 produces the move command $Z_c$, the pulse distributor 103 executes the pulse distribution computation and provides the distributed pulses $P_s$. Upon receiving the pulses $P_s$, the accelerator/decelerator circuit 104 accelerates and decelerates the pulse rate thereof and applies the train of command pulses $P_i$ to the error calculating and storing circuit 107. Thus, the content of the error register 107b becomes non-zero, so that the digital-to-analog converter 108 provides a voltage and the motor 105 is driven by the speed control circuit 109 so as to move the electrode EP. When the motor 105 has rotated by a predetermined amount, the feedback pulse FP is generated by the pulse coder 106 and is applied to the error calculating and storing unit 107. Thenceforth, the electrode EP is servo-controlled with the difference $E_r$ maintained at a constant value in a steady state until it is fed for machining to a desired, or target, position.

When the electrode EP is being fed for machining and comes into contact with the workpiece, a short-circuit signal SS is generated. When this occurs, a retraction control section within the control unit 102 sends the pulse distributor 103 a command for retracting the electrode EP. The pulse distributor 103 responds to the retraction command by generating retraction, or "back-up", pulses BS that cause the content of error register 107b become zero after a predetermined time. From then on the electrode EP is retracted or backed up by the retraction pulses to separate from the workpiece.

It will be appreciated from the foregoing discription of the the conventional method that, despite the generation of the short-circuit signal SS that initiates the retraction command, the electrode EP will not back up unless the pulse number left in the error register 107b is stepped down to zero by the generation of the pulses BS. In other words, retraction of the electrode EP does not start until the content of error register 107b becomes non-zero, which occurs after the passage of a predetermined time. Moreover, the electrode EP continues to advance, rather than back up, until the content of the error register 107b becomes zero. This delays the resumption of machining and prolongs machining time.

SUMMARY OF THE INVENTION

An object of the present invention is to provide a method and apparatus for controlling an electric discharge machine in such fashion that the electrode may be retracted immediately upon the issuance of a retraction command generated while the electrode is being fed for machining.

Another object of the present invention is to provide a method and apparatus for controlling an electric discharge machine in such fashion as to shorted machining time.

A further object of the present invention is to provide a method and apparatus for controlling an electric discharge machine, wherein the motor of the machine is controlled by means of a speed command, with the present position of the electrode being found of the basis of pulses each of which is generated whenever the motor rotates by a predetermined amount.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
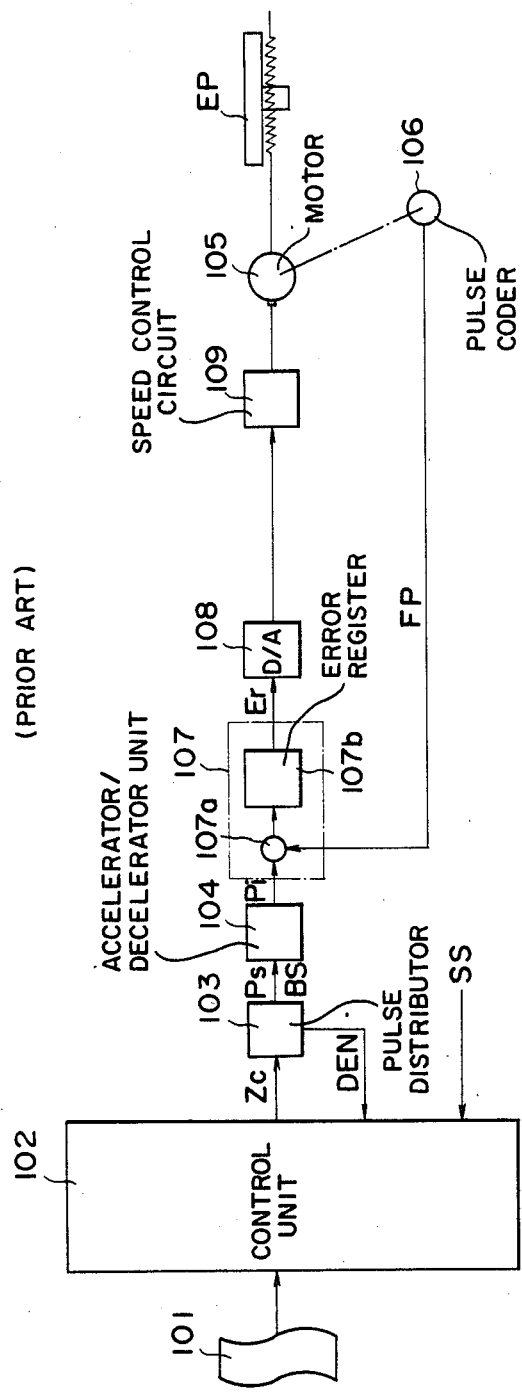
FIG. 2 is a block diagram for describing the conventional method.
Figure 3:
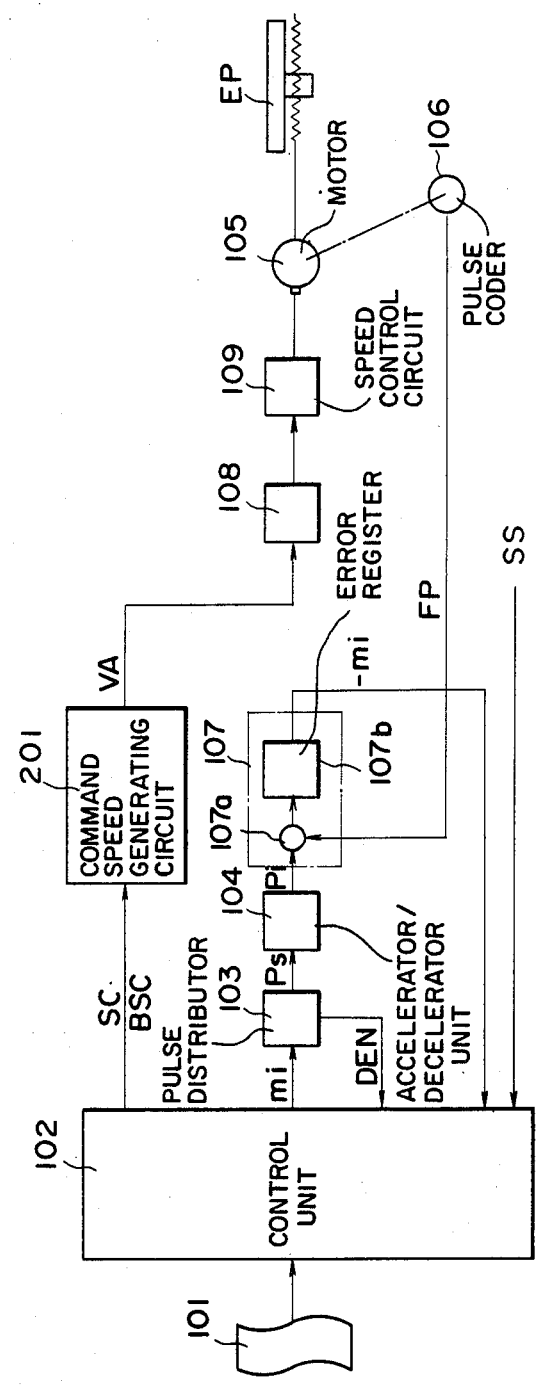
FIG. 3 is a block diagram illustrating an arrangement for practicing the method of the present invention.

The arrangement of FIG. 3 differs from that of FIG. 2 in the following respects:

(a) A command speed generating circuit 201 is provided for converting speed control data SC into a speed command value VA.

(b) There is no connection between the error register 107b and the DA converter 108.

(c) The motor 105 is driven in accordance with a voltage obtained by converting, into an analog signal, the speed command value VA delivered by the command speed generating circuit 201.

(d) The current position of the electrode EP can be determined by a follow-up technique or the like, to be described later.

More specifically, the command speed generating circuit 201, which receives speed control data $S_c$ from the control unit 102, converts the data $S_c$ into a digital speed command value VA for application to the DA converter 108, on the basis of which the DA converter 108 produces an analog voltage. The speed command value VA produced by the command speed generating circuit 201 takes into account the DA conversion rate for feeding the electrode EP at the commanded feed speed, in keeping with such factors as the gear ratio of the motor. The command speed generating circuit 201 can be constructed as a memory which stores speed command values corresponding to the speed control data.

Figure 1:
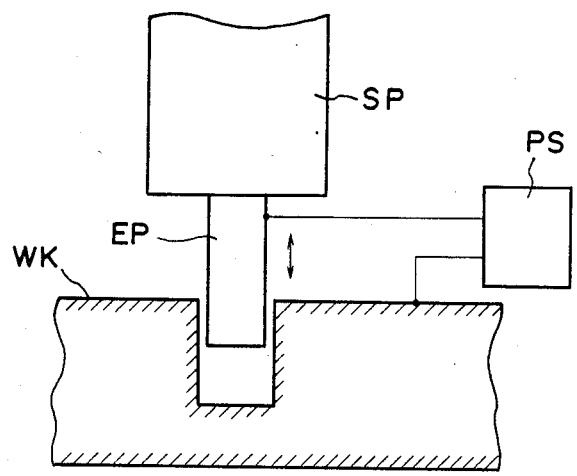
FIG. 1 is a schematic explanatory view of an electric discharge machine to which the present invention is applied.
Figure 4:
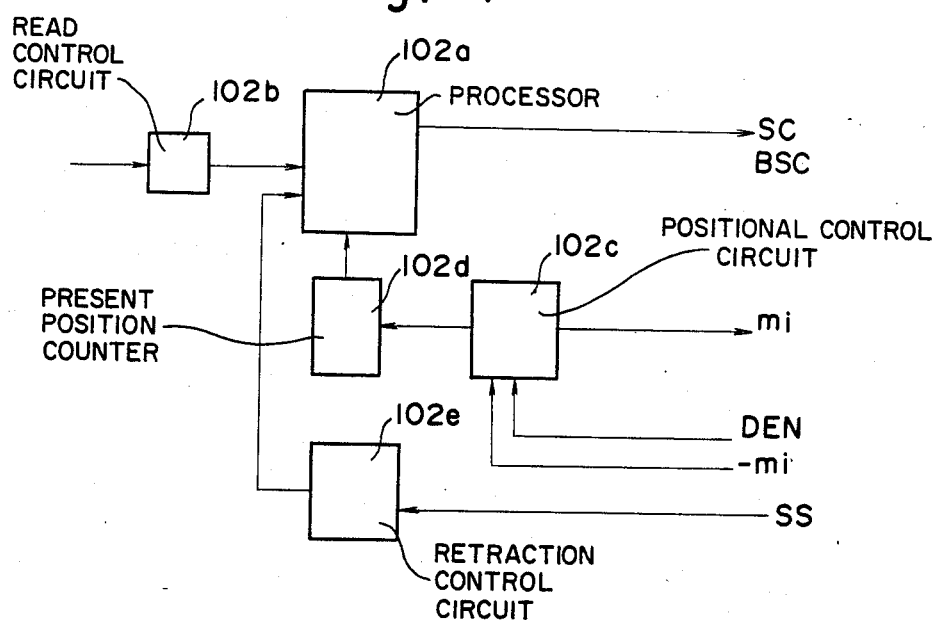
FIG. 4 is a block diagram illustrating a control unit included in the arrangement of FIG. 3.

The control unit 102, as shown in FIG. 4, includes a processor 102a comprising a microcomputer, a read control circuit 102b for reading in commands from the command tape 101, a positional control circuit 102c which reads the content of the error register 107b, changes the sign of the read data and then applies the data to the pulse distributor 103, a present position counter 102d for counting up the data read by the positional control circuit 102c and a retraction control circuit 102e.

In operation, when a positional command and speed command concerning the electrode EP are read into the control unit 102 from the command tape 101 by means of the read control circuit 102b, the processor 102a provides the command speed generating circuit 201 with speed-related information, namely the machining speed (said information also including the speed for retraction control, overrides, and the like). The speed command generating circuit 201 responds by producing the prescribed speed command VA, which is converted into a voltage by the DA converter 108 to drive the motor 105 through the speed control circuit 109, whereby the electrode EP is fed (advanced) for machining at the commanded speed.

As motor 105 rotates to transport the electrode EP, the pulse coder 106 generates a single feedback pulse FP each time the motor rotates by a predetermined amount. The content of error register 107b is updated, i.e., decremented by one step each time a feedback pulse FP is produced. If we assume that the content of the error register 107b initially is zero, then its content will be decremented to $-m_1$ by the generation of $m_1$-number of feedback pulses. The $-m_1$ data is read by the positional control circuit 102c of the control unit 102 and fed thereby into the present position counter 102d, which performs the operation:

$$M + m_1 \rightarrow M \qquad (1)$$

where the initial value of M is zero. The positional control circuit 102c also applies the data to the pulse distributor 103 upon changing its sign. The pulse distributor 103 responds to the $m_1$ data by immediately performing a pulse distribution operation to produce the distributed pulses $P_s$. The distributed pulses $P_s$ enter the accelerator/decelerator circuit 104 which responds by producing the command pulses Pi. These pulses are applied to the error computing and storing unit 107, the content of the error register 107b being updated in the positive direction each time a pulse $P_i$ arrives. The error computing and storing unit 107 concurrently receives the feedback pulses FP at its other input as long as the motor 105 is rotating. These pulses update the error register 107b in the negative direction each time one of them arrives. Accordingly, if we assume that the time at which the content $-m_1$ is read out of error register 107b is $t_1$, that the time at which the $m_1$-number of distributed pulses $P_s$ is generated is $t_2$, and that $m_2$-number of feedback pulses FP are generated between times $t_1$ and $t_2$, then the content of error register 107b at time $t_2$ will be $-m_2$.

The pulse distributor 103, upon producing the number of distributed pulses $P_s$ commensurate with the magnitude of the command, issues a signal DEN indicative of the end of the pulse distribution operation. The positional control circuit 102c responds to the signal DEN by once again reading the content ($-m_2$) of the error register 107b and applying this data to the present position counter 102d, which now performs the addition:

$$M + m_2 \rightarrow M \qquad (1')$$

The positional control circuit 102c also applies the data $m_2$ (whose sign has been changed) to the pulse distributor 103. Owing to the operation (1') above, M is equal to $m_1 + m_2$. Thenceforth, each time the pulse distribution end signal is generated, the positional control circuit 102c reads the content $m_i$ ($i = 1,2,3 \ldots$) of the error register 107b, the counter 102d performs the addition:

$$M + m_i \rightarrow M \ (= \Sigma m_i) \qquad (1'')$$

and the numerical value $M_i$ is applied to the pulse distributor 103. From then on the aforesaid operations are repeated.

The foregoing is summarized by the following table:

| Time | t1 | t2 | t3 | — | ti | — | tj | tj + 1 |
|---|---|---|---|---|---|---|---|---|
| Number of pulses FP generated | $m_1$ | $m_2$ | $m_3$ | ... | $m_i$ | ... | $m_j$ | 0 |
| Number of pulses Ps generated | 0 | $m_1$ | $m_2$ | ... | $m_{i-1}$ | ... | $M_{j-1}$ | $m_j$ |
| Content of error register | $-m_1$ | $-m_2$ | $-m_3$ | ... | $-m_i$ | ... | $-m_j$ | 0 |

In the table shown above, t1 is the time at which the content of error register 107b is initially read, ti ($i = 1,2 \ldots$) is the time at which the pulse distribution end signal is generated, and $m_i$ represents the number of pulses produced between time ti−1 and time ti. It will be appreciated from the table that the content M of the present position counter 102d, namely the total number of feedback pulses produced up to time tj+1, may be expressed by the following:

$$M = \sum_{i=1}^{j+1} m_i$$

which is precisely in agreement with the sum total exhibited by the error register 107b. Accordingly, if the content M of the present position counter 102d is read by the processor 102a and compared with the commanded amount of movement, and if the processor 102a sends the speed command value VA to zero when M and the commanded amount of movement coincide, then the motor 105 will be stopped instantly to halt the electrode EP at the target position. This technique of determining the present position of a movable member through the foregoing control operation is referred to as follow-up control.

There is another method of determining the position of the electrode EP without relying upon follow-up control. This entails severing the connection between the accelerator/decelerator circuit 104 and the error computing and storing unit 107 in FIG. 3, so that the latter receives only the feedback pulses. The read control circuit 102c is adapted to read the content of the error register 107b at a given sampling cycle, with the error register 107b being cleared to zero at the same time that it is read. The present position counter 102d keeps a running total of the number of feedback pulses read by the read control circuit 102c each sampling cycle, so that the present position of the electrode can always be known.

When the electrode EP contacts the workpiece as it is being fed for machining, the short-circuit signal SS is generated. When this occurs, the retraction control circuit 102e in the control unit 102 sends the processor 102a a retraction speed command BSC, the processor 102a responding by providing the command speed generating circuit 201 with speed information for controlling the retraction of the electrode EP. As a result, the command speed generating circuit 201 immediately issues a speed command whose sign is the reverse of that which has hitherto prevailed, in order to back up the electrode. The motor 105 consequently is rotated in the opposite direction to retract the electrode EP. When a short circuit is no longer detected the processor 102a provides the command speed generating circuit 201 with the machining speed to again feed the electrode for machining. It should be noted that the amount of electrode movement and its present position at the time of retraction may be detected by a technique such as the follow-up technique described above.

In accordance with the present invention as described and illustrated hereinabove, the electrode can be retracted immediately at the instant a short circuit occurs, and advanced for machining as soon as the short circuit is overcome. The result is an electric discharge machining operation of improved efficiency owing to a shorter machining time.

It should be noted that control of movement in accordance with the method of the invention is effected only with respect to the direction in which the electrode is fed for machining; control of movement in other directions can be achieved by an ordinary pulse distribution operation.

As many apparently widely different embodiments of the present invention can be made without departing from the spirit and scope thereof, it is to be understood that the invention is not limited to the specific embodiments thereof except as defined in the appended claims.

What we claim is:

1. A method of controlling an electric discharge machine wherein a motor for establishing relative movement between an energized electrode and a conductive workpiece is driven in accordance with NC command data in order to machine the workpiece to a desired shape by an electric discharge produced between the electrode and workpiece, which method comprises the steps of:
   (a) converting speed information contained in the NC command data into a speed command value and driving the motor in response to the speed command value to control the speed of the motor;
   (b) counting, by means of a counter, pulses generated by a sensor in response to movement of said motor;
   (c) detecting an error count in the counter between the pulses generated by the sensor and a desired number of pulses;
   (d) reading the error count in said counter at predetermined intervals;

(e) adding said error counts cumulatively at said predetermined intervals to determine the present position of the electrode; and (f) sending a command to the counter including a number of pulses equivalent to said error count each time the error count is read, to cancel said error count.

2. A method of controlling an electric discharge machine according to claim 1, in which step (d) comprises reading the counted value after said pulses are sent thereto.

3. A method of controlling an electric discharge machine according to claim 1, further comprising the steps of:

(g) generating a retraction speed command when a retraction command indicating an anomolous discharge between the electrode and workpiece is generated, and (h) converting said retraction speed command into a speed command value to rotate said motor in the reverse direction.

4. An apparatus for controlling an electric discharge machine wherein a motor for establishing relative movement between an energized electrode and a conductive workpiece is driven in accordance with command data in order to machine the workpiece to a desired shape by an electric discharge produced between the electrode and workpiece, which apparatus comprises:

processor means for sensing when the electrode is short circuited to said workpiece, for receiving positional command data and speed command data, for providing speed control data responsive to said speed command data and for providing a retraction speed command in response to sensing a short circuit;

command speed generating means for converting said speed control data into a speed command value;

driving circuit means, connected to receive said speed command value and said retraction speed command, for driving the motor in accordance with the speed command value and for driving the motor in response to said retraction speed command so that said electrode immediately retracts from the workpiece in response to a short circuit being sensed;

sensor means for generating a pulse each time the motor is rotated by a predetermined amount;

counter means for counting the pulses generated by said sensor means and for detecting an error count between the pulses generated by the sensor means and a desired number of pulses provided by said processor;

said processor means cumulatively adds the error count, which is read out of the counter means at predetermined intervals, and sends a command to said counter means each time the error count is read, to cancel said error count;

pulse distributing means for receiving the added error count read by said processor means following a reversal in sign, and for supplying said counter means with a number of pulses in accordance with said received added error count.

5. An apparatus for controlling an electric discharge machine according to claim 4, in which said processor means reads the counted value in said counter means in response to a completion pulse generated by said pulse distributing means after said counter means is supplied with said pulses.

6. An apparatus for controlling an electric discharge machine according to claim 4, in which said processor means delivers said speed control data and said retraction speed command upon receiving a retraction command.

* * * * *